United States Patent [19]
Boursy

[11] Patent Number: 6,019,575
[45] Date of Patent: Feb. 1, 2000

[54] EROSION ENERGY DISSIPATER

[75] Inventor: Andrew P. Boursy, Marlborough, Conn.

[73] Assignee: United Technologies Corporation, Hartford, Conn.

[21] Appl. No.: 08/928,149

[22] Filed: Sep. 12, 1997

[51] Int. Cl.[7] .................................................. F01D 25/08
[52] U.S. Cl. ...................... 415/178; 415/169.1; 415/201; 415/121.2
[58] Field of Search ..................... 415/176, 178, 415/115, 116, 121.2, 169.1, 189, 190, 201; 55/306, 471, 439

[56] References Cited

U.S. PATENT DOCUMENTS

| | | | |
|---|---|---|---|
| 2,553,562 | 5/1951 | Evans | 299/143 |
| 2,770,501 | 11/1956 | Coanda | 299/140 |
| 3,675,855 | 7/1972 | Harwood et al. | 239/597 |
| 4,053,254 | 10/1977 | Chaplin et al. | 415/116 |
| 4,082,522 | 4/1978 | Koga | 55/419 |
| 4,155,681 | 5/1979 | Linko, III et al. | 415/144 |
| 4,266,951 | 5/1981 | Calvert | 55/84 |
| 4,356,009 | 10/1982 | Calvert | 55/416 |
| 4,672,886 | 6/1987 | Stouffer | 98/2.09 |
| 4,687,495 | 8/1987 | Maddox | 95/260 |
| 5,027,604 | 7/1991 | Krueger | 60/752 |
| 5,271,712 | 12/1993 | Brandon | 415/121.2 |
| 5,359,620 | 10/1994 | Akins | 372/58 |
| 5,439,347 | 8/1995 | Brandon | 415/121.2 |
| 5,523,063 | 6/1996 | Anderson | 422/224 |
| 5,662,292 | 9/1997 | Greene et al. | 244/53 B |

*Primary Examiner*—Edward K. Look
*Assistant Examiner*—Richard Woo
*Attorney, Agent, or Firm*—Monica G. Krasinski

[57] ABSTRACT

A turbine (18) of a gas turbine engine includes erosion energy dissipaters (44) which comprise of a plurality of inlet orifices (46) and a large diameter outlet orifice (48). The erosion energy dissipater reduces erosion of associated structure due to impingement of particulates entrained in airstreams. Various construction details are described to provide cooling air containing entrained particulates to the high pressure turbine case of a gas turbine engine without eroding the case.

5 Claims, 3 Drawing Sheets

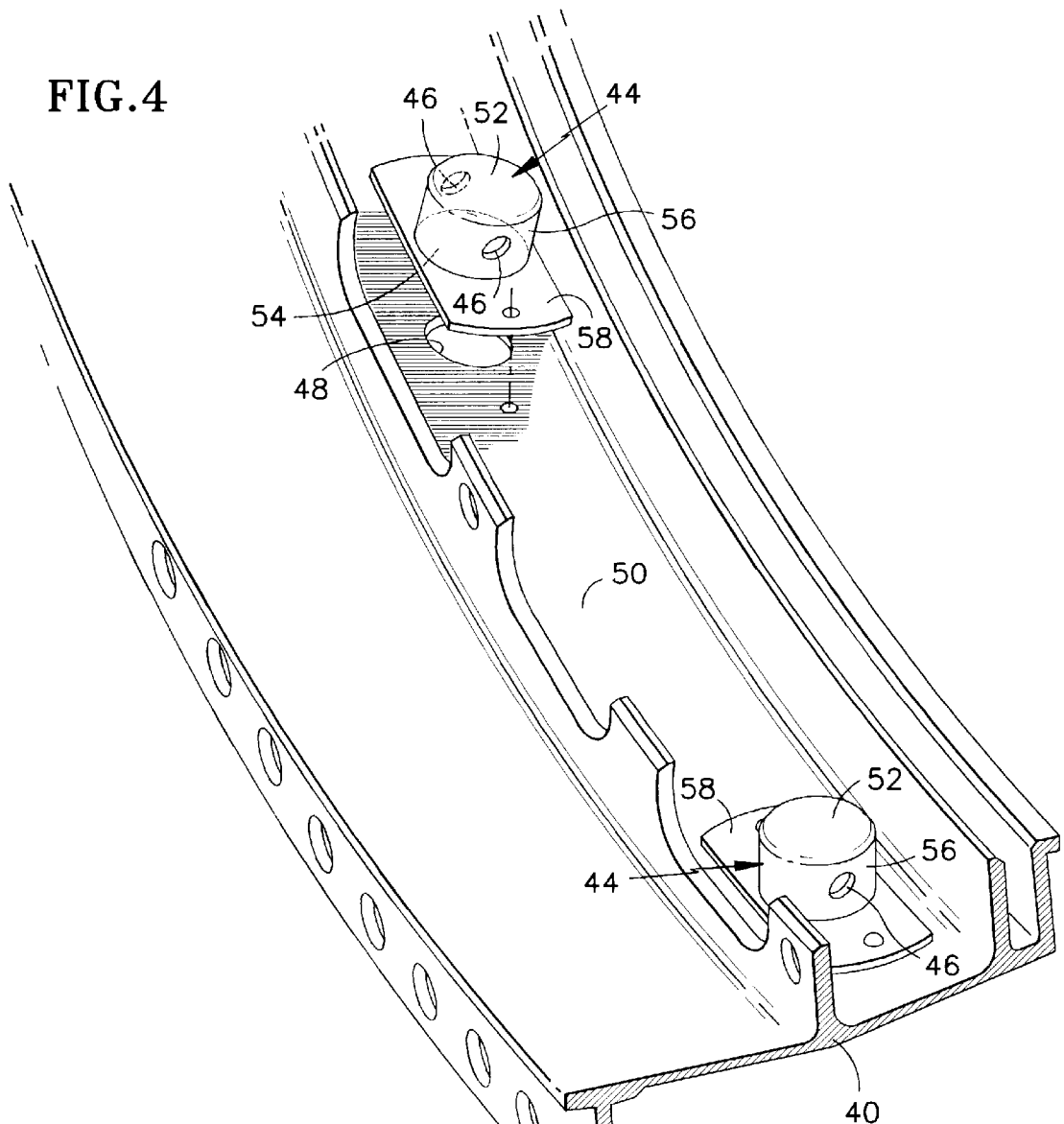
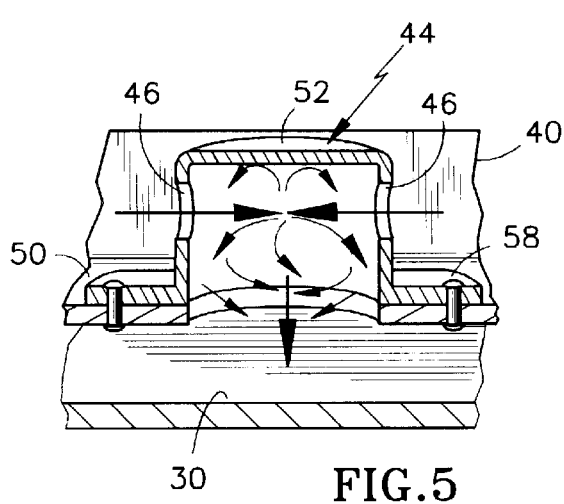

EROSION ENERGY DISSIPATER

TECHNICAL FIELD

This invention relates to an apparatus and method for preventing the erosion of structure due to the impingement thereon of particulate matter and, more particularly, to an apparatus for protecting the high pressure turbine case in a gas turbine engine from the erosive effects of particulates in the cooling airstreams.

BACKGROUND ART

In gas turbine engines, fuel is burned within a combustion chamber to produce a hot effluent. The effluent is expanded within a turbine section across alternating rows of stationary stator vanes and rotating rotor blades, to produce useable power. Effluent temperatures at the initial rows of vanes and blades commonly exceed two thousand degrees (2000° F.). Blades and vanes susceptible to damage by the hot effluent are cooled by air compressed upstream within the engine and bled to the turbine for cooling. Moreover, the turbine case is also susceptible to damage by the hot effluent.

Cooling of the turbine case is known in the art. Refer to U.S. Pat. No. 4,053,254 to Chaplin et al entitled "Turbine Case Cooling System." One substantial problem associated with cooling air used to cool the turbine case is the presence of particulates. The impingement of entrained particulates on the surface of the turbine case may erode the case. Inspection of turbine cases has shown that the case inner wall is susceptible to erosion corresponding to areas in close proximity to the cooling holes present in the turbine first vane support. Particulates pass through the cooling holes in close proximity to the turbine case and cause local areas of erosion in the case walls.

Erosion as considered here has to do with the removal of surface material by impingement of solid particulates. These particulates are present in the working medium flow path either as foreign matter ingested from the engine operating environment or as byproducts inherent in the combustion process. The majority of the particulates are very fine in terms of the size and are carried through the different sections of the engine. The erosion caused by the particulates entrained in the cooling air is dependent, at least in part, on the velocity of the particulates. Erosion of ductile materials such as copper, 6061 aluminum and annealed SAE 1215 steel, is proportional to the velocity raised to the power "a" ($V^a$), where the exponent "a" is a value of 2.4–2.7. It has also been determined, with all other conditions being equal, that erosion wear upon steel depends on the diameter of impinging particulate matter. The larger the diameter of the particulates the greater the erosion wear. For turbine cases, the volume of material erosively removed is approximately proportional to the velocity of the particulates to the 2.5 power. Thus, as the velocity of the cooling airstream having entrained particulates increases, so does the erosion caused by the entrained particulates.

Inspection of prior art high pressure turbine case inner walls has revealed areas of local erosion of material, which appears as pitting in the case wall. The maximum allowable turbine case erosion depth according to industry standards is 0.010 inches. However, under actual engine operating conditions erosion depths on the order of 0.030 inches have been observed. Thus, the amount of erosion has in some cases progressed beyond this allowable limit. Local stress increase in the area of the pittings reduces the turbine case strength. This condition can occur in a very short period of time and cycles of engine operation if sand conditions are present such as would be the case in a desert environment.

There are several possible solutions to the erosion problem associated with turbine cases caused by particulates entrained in the cooling airstreams. The current approach for reducing the erosion damage is circumferentially adjusting the position of the high pressure turbine first vane support on the stator slightly, thus moving the cooling holes to a second location and allowing different areas of the turbine case to be eroded due to particulate impingement. However, this is a short-lived solution as only one circumferential adjustment is possible. Further adjustments would lead to positioning eroded areas on the turbine case to be close together which would eventually destroy the case. Another possible solution would be increasing the turbine case wall thickness. However, such addition of material would have a significant impact on turbine weight and invariably engine weight which is undesirable. In addition, the case albeit thicker, will still be eroded in areas subject to particulate impingement.

DISCLOSURE OF THE INVENTION

According to the present invention, an erosion reduction apparatus having two or more inlet orifices and a large outlet orifice such that airstreams entering the apparatus through the inlet orifices, impact each other and dissipate the energy of particulates entrained in the airstreams which then exit through the outlet orifice which slows down the velocity of the airstream.

The inlet orifices are sized to provide a metering function. Opposing velocity components of the airstreams entering the inlet orifices, impact and cancel the energy of the entrained particulates. The low velocity airstream with entrained particulates which exits the erosion energy dissipater of the present invention causes a reduced amount of erosion damage to any surface it impinges upon.

The primary advantage of the present invention is the resultant enhanced durability and longevity of the turbine case. The present invention reduces erosion thus decreasing wear and the associated local stresses. This advantage results in fewer repairs and overhaul of associated structures. Another advantage is the ease and low cost of manufacturing turbine first vane supports with the erosion reduction apparatus. Turbine first vane supports of the prior art can be retrofitted in a cost effective manner to include the erosion energy dissipaters which results in reducing erosion of associated structure.

The foregoing and other objects, features and advantages of the present invention will become more apparent in the light of the following detailed description of the best mode for carrying out the invention and from the accompanying drawings which illustrate an embodiment of the invention.

BRIEF DESCRIPTION OF THE DRAWINGS

FIG. 4 is an exploded isometric view of a portion of the first vane support in the high pressure turbine including the erosion reduction apparatus of the present invention.

FIG. 5 is a cross-sectional view of the erosion reduction apparatus of the present invention taken along the lines 5—5 of FIG. 3. Arrows in the figure show schematically the flow of the airstream in the apparatus.

BEST MODE FOR CARRYING OUT THE INVENTION

Figure 1:
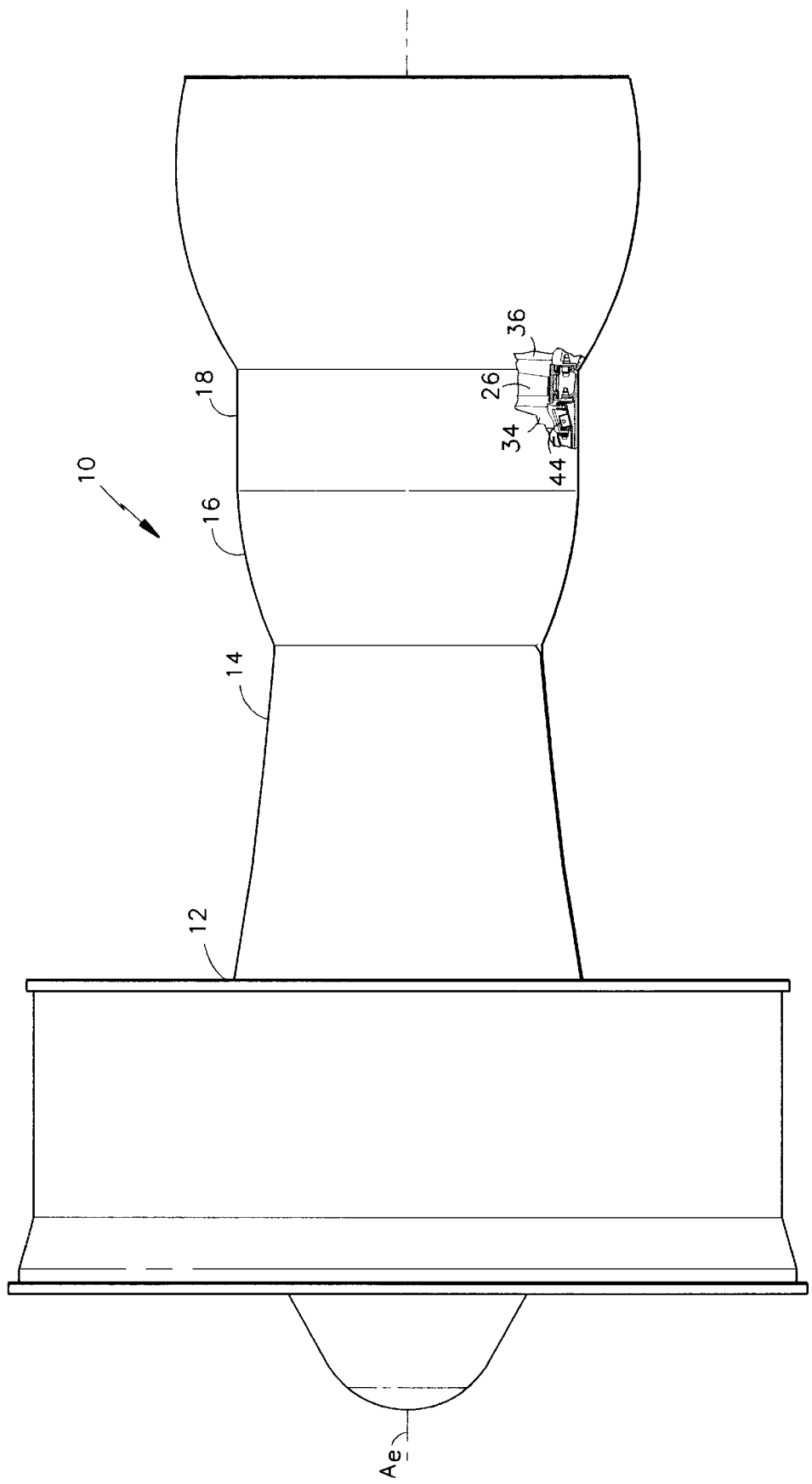
FIG. 1 is a schematic view of a gas turbine engine with a portion broken away to show a turbine case and first vane support.

Referring to FIG. 1, an axial flow, turbofan gas turbine engine 10 comprises generally a fan section 12, a compressor section 14, a combustor section 16 and a turbine section 18 disposed along axis $A_e$ and operates in accordance with principles well known in the art.

Figure 2:
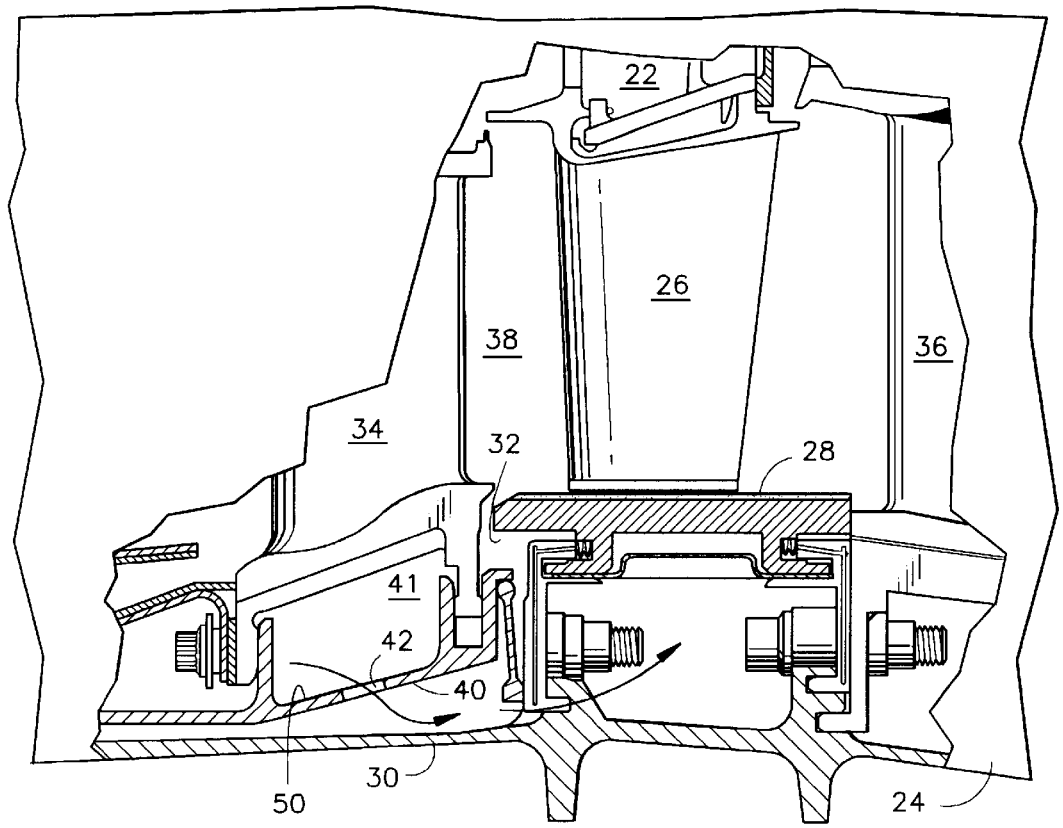
FIG. 2 is an enlarged fragmentary cross-sectional view of the high pressure turbine showing a prior art orifice for turbine case cooling. Arrows in the figure show schematically the flow of the cooling air through the orifice.

Referring to FIG. 2, a turbine section prone to damage by erosive particulates is shown. The turbine section is comprised of a rotor assembly 22 and a stator assembly 24. A plurality of rotor blades, as represented by the single blade 26, extend radially outwardly toward the stator assembly. An outer air seal 28 which is affixed to the turbine case 30 radially opposes the blades 26 and forms in part an annular chamber 32 between the seal 28 and the case 30. The seal 28 keeps the gas flow in a primary flow path 38 between the turbine stator and rotor. A first row of stator vanes, as represented by the single vane 34, is affixed to the case upstream of the outer air seal. The stator vanes align the flow of the working medium gases while the rotor blades collect the energy of the working medium gases and turn the turbine which in turn drives the compressor. The first vane is supported radially inwardly by the first vane support 40. The first vane support is annular in shape (see FIG. 4) and includes a plurality of metering orifices 42 spaced linearly therealong. A second row of stator vanes, as represented by the single vane 36, is affixed to the case downstream of the outer air seal. The working medium gases flow alternately through the rows of vanes and blades of the turbine section.

Cooling air containing erosive particulates (such as sand) is bled from the high pressure compressor to the first vane cavity 41. As only a specific quantity of air is required for cooling the turbine case, the cooling air having entrained particulates is usually metered through the orifices 42. Higher cooling air pressure inherent in the first vane cavity 41 causes air to flow from the cavity 41 through the orifices 42. The velocity of the cooling air and the particulates contained in the air is accelerated as the air flows through the orifices 42 due to the reduced flow area of the orifices as compared to the flow area of the annular chamber 32. If this high velocity stream impinges on a structure, such as the turbine case, erosion of the structure is likely to take place. Erosion of the structure depends on several conditions such as the number and type of impinging particulates, particulate size, impact angles of the particulates, temperature and velocity of particulates. With other conditions being constant, this erosion is proportional to the velocity of the cooling airstream containing particulates.

Figure 3:
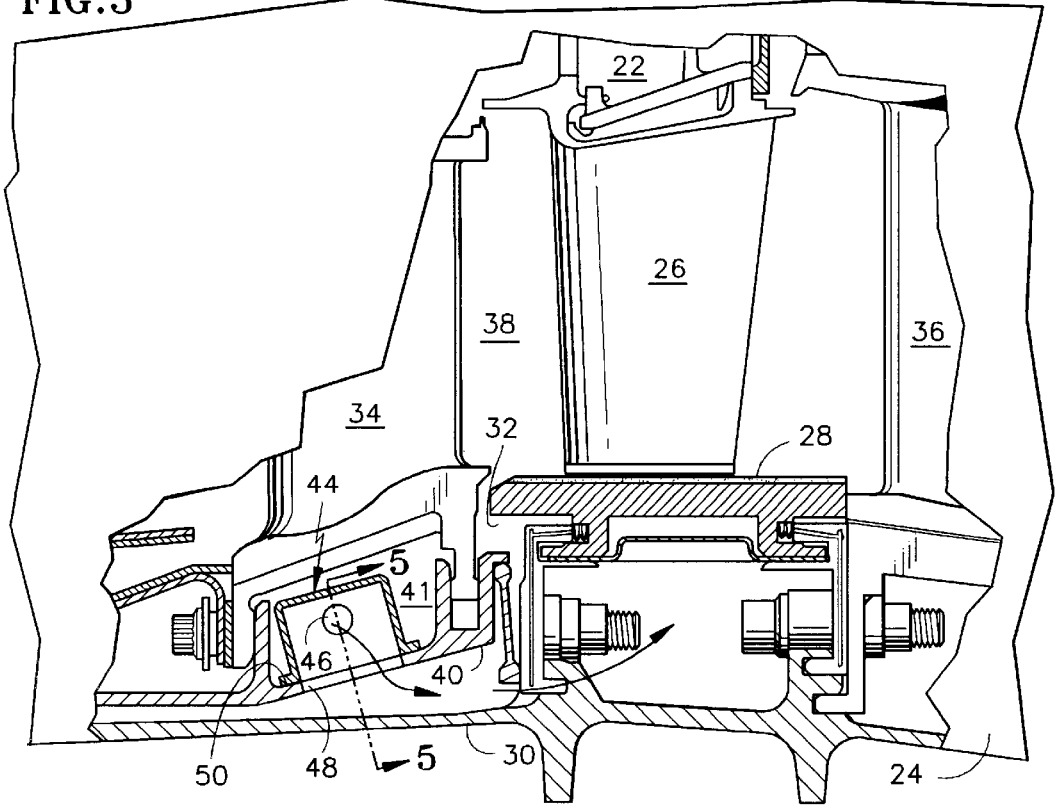
FIG. 3 is an enlarged fragmentary cross-sectional view similar to FIG. 2 of the high pressure turbine showing the erosion reduction apparatus of the present invention. Arrows in the figure show schematically the flow of the cooling air through the present invention.

Referring to FIG. 3, a cross-sectional view of a turbine section including the erosion energy dissipater 44 of the present invention is shown attached to the inner diameter 50 of the annular first vane support 40 (also shown in FIG. 4). The present invention dissipater 40 includes a plurality of inlet orifices 46 and a large diameter outlet orifice 48.

Referring to FIG. 4, the erosion energy dissipater 44 has a first closed end 52 and a second open end 54 radially inward of the first end. The first and second end are separated by a sidewall structure 56. The dissipater apparatus 44 has a flange 58 adjacent the second open end by which it is secured or riveted to the first vane support.

During operation of the engine, cooling air from the high pressure compressor flows around the burner and into the first vane cavity 41. This cooling air has particulates entrained in it. These particulates are present in the working medium flow path as they are ingested from the environment by the engine. The majority of the particulates are very fine in terms of size, thus they are carried through the different sections of the engine as the working medium gases flow axially downstream.

Once cooling air enters the first vane cavity 41, it is usually metered through the inlet orifices 46 of the erosion energy dissipater 44. The inlet orifices are of equal size but oppose each other in location; therefore they cause airflow through them to be oppositely directed. Cooling airflow and erosive particulates travel through the inlet orifices at high speed. The opposing airstreams, shown in FIG. 5, impact and cancel each other's energy. The cooling airflow and erosive particulates then exit the erosion energy dissipater through the large diameter outlet orifice 48 which slows down the flow to further reduce erosion. In current high performance modem gas turbine engines, the area ratio defined as the ratio of the area of outlet orifice to that of the area of the inlet orifices is about at least 4.0. In the preferred embodiment, due to engine geometry constraints, the area ratio is 4.7. However, this ratio will depend on and be determined by structural and thermodynamic operating characteristics of engines in which the apparatus will be used. As the cooling airflow and particulates exit the outlet orifice of the dissipater, they impact the solid surface of the turbine case. The erosion of the turbine case is reduced significantly as the energy of the particulates has been dissipated prior to impacting with the turbine case.

The primary advantage of the present invention is the enhanced durability and longevity of the turbine case. The present invention reduces erosion and thus reduces the wear of the turbine cases. This results in fewer repairs and overhauls of turbine cases and associated structure.

Another advantage is the ease and low cost of manufacturing turbine first vane with the erosion energy dissipater. Turbine first vane supports of the prior art can be refurbished in a cost effective manner to include the erosion energy dissipaters which results in reduced erosion of the turbine cases.

Although the invention has been shown and described with respect to a preferred embodiment thereof, it should be understood by those skilled in the art that various changes and omissions in the form and detail thereof may be made therein without departing from the spirit and scope of the claimed invention. For example, although we have shown the inlet orifices to be located directly opposite, i.e. one hundred and eighty degrees (180°) across, it will be understood that the invention will reduce the erosive energy of particulates with other configurations. It will be appreciated that so long as the inlet airstreams enter from directions having generally opposite vector components one will achieve the erosive energy dissipation provided by the present invention.

What is claimed is:

1. An erosion reduction apparatus characterized by:
   two or more inlet orifices, each located in said apparatus such that a first stream of high velocity gas flow having entrained particulates disposed therein, enters a first orifice from a first direction, and impacts a second stream of high velocity gas flow having entrained particulates therein which enters a second orifice from a second direction, a component of which is generally opposite said first direction, to mutually cancel the energy of the particulates in said first and second streams, and an outlet orifice wherein the resultant gas flow is ejected through the outlet orifice at a lower velocity, wherein erosion of structure adjacent the outlet is significantly reduced.

2. The erosion reduction apparatus of claim 1, further characterized by the inlet orifices and the outlet orifice having a first and second area associated with them such that the ratio of the area of the outlet orifice to the area of the inlet orifices is at least about 4.0.

3. The erosion reduction apparatus of claim 1, further characterized by the second inlet orifice being located generally opposite from the first inlet orifice.

4. In a gas turbine engine having a turbine stator assembly having a turbine vane support with an inner and outer wall, and a turbine case having an inner and outer wall, the turbine vane support characterized by:

a plurality of erosion reduction caps circumferentially spaced about the inner wall of the turbine vane support, the caps having a first closed end and second open end, the first and second end separated by sidewall structure, first and second inlet orifices having a first area in the sidewall structure located one hundred and eighty degrees (180°) across from each other such that a first portion of high velocity gas flow having entrained particulates entering from the first inlet orifice will directly impact a second portion of high velocity gas flow having entrained particulates entering from the second orifice, to cancel the velocity of the resultant gas flow having entrained particulates, and an outlet orifice in the second end having a second area at least about four (4) times larger than the area of first or second inlet orifices such that the resultant gas flow exits the apparatus through the outlet orifice at a lower velocity, wherein erosion of the inner wall of the turbine case adjacent the second end is significantly reduced.

5. A method for providing cooling air having entrained particulates to gas turbine engine components including the steps of splitting the flow of cooling air into at least two generally oppositely directed streams;

impacting the oppositely directed streams to lower the kinetic energy of the entrained particulates and combining the flows into a resultant flow, and directing the resultant flow of cooling air having particulates through a large diameter orifice wherein the cooling air lowers in velocity, and reduces erosion of structure adjacent the large diameter orifice due to entrained particulates.

* * * * *